Nov. 14, 1950    B. G. BROWN    2,530,283
FILTER
Filed Oct. 5, 1945
Fig. 1.
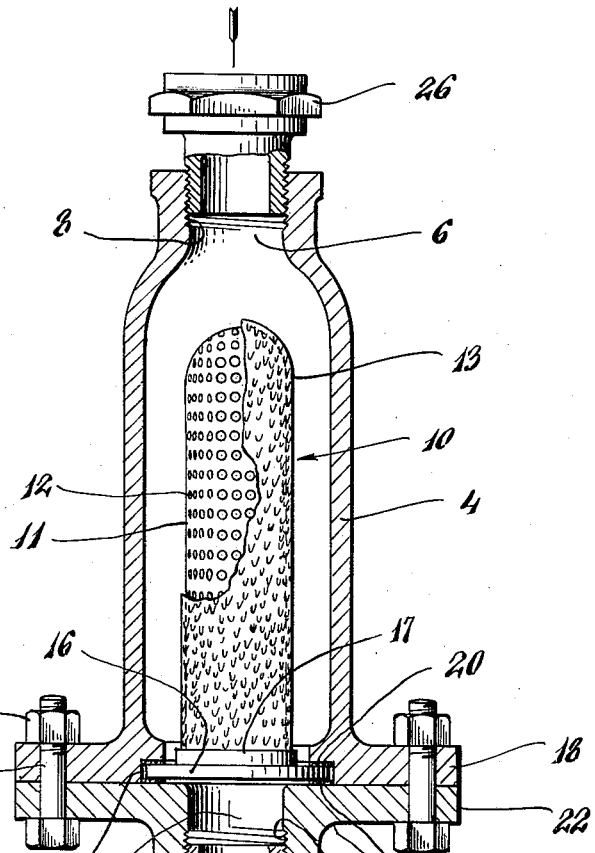
Fig. 3.
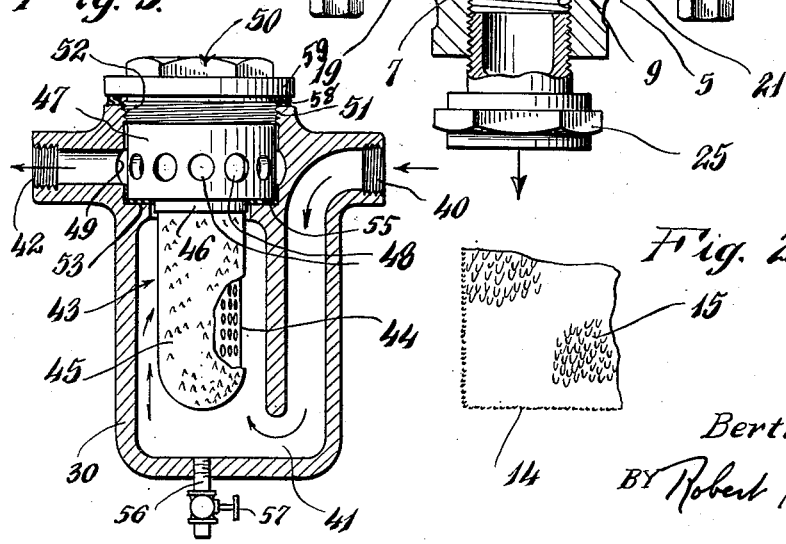
Fig. 2.
INVENTOR
Bertram G. Brown
BY Robert Irving Williams
ATTORNEY Patented Nov. 14, 1950

2,530,283

UNITED STATES PATENT OFFICE 2,530,283

FILTER

Bertram G. Brown, Yonkers, N. Y.

Application October 5, 1945, Serial No. 620,509

12 Claims. (Cl. 210—164)

This invention relates to filters adapted for the removal of impurities from water in a feed line, such for example as a feed line for boilers and the like.

The useful life of boilers can be greatly increased and the expense of frequent cleanings avoided by filtering the water supplied thereto and this is particularly true when condensed steam from pumps, engines, air compressors, heating coils or the like, or water from hot water systems or other heated water is returned to the coil. Ordinary filters either lack effective filtering action or are unable to withstand the pressure or heat or both for a satisfactory length of time. Moreover, most filters which otherwise might have some practicability in feed lines are so difficult to disassemble and reassemble as to require an inordinate amount of time and expense to perform the frequent cleanings necessary in the filtering of liquids which are heavily charged with impurities.

With the foregoing considerations in view, the present invention has for an object the provision of a filter which is strong and permanent in construction, which will satisfactorily resist feed line pressure, and which will effectively filter liquids containing a high degree of difficultly removable impurities; and more especially the provision of a strong, effective and pressure-resistant filter which can be disassembled, cleaned, and reassembled with extreme ease.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Figure 1 is a partly sectional view of a filter exemplifying the invention; and

Fig. 2 is a fragmentary enlarged view of the filter fabric exemplified in Fig. 1.

Fig. 3 is a partly sectional view of a different filter exemplifying the inventon.

In the present embodiment of the invention there are provided casing members 4 and 5 having inlet and outlet openings 6 and 7 and provided with interior screw threads 8 and 9 respectively. The filter proper 10 is within the interior of the casing member 4, and as exemplified comprises a metal cup 11 having cylindrical side walls and perforations 12 throughout its surface, these perforations being substantially in sufficient number and of sufficient size to permit the flow of the amount of liquid admitted by the inlet opening 6. It is to be noted that the outlet opening 7 as exemplified is of the same size as the inlet opening 6, and, while it may be larger than the inlet opening, it should be not substantially smaller. The provision of perforations which will carry the flow admitted by the inlet opening and of an outlet opening which will carry the flow passed by the inlet opening and the perforations prevents the building up of any pressure which might harm the filter or cause leaks. It is noted also that in the present instance the cylinder is cup-shaped having a perforate dome as well as perforate sides. Surrounding the cylinder is a stretchable cloth member 13. This, preferably and as exemplified, is tightly knitted, thus combining good strength and straining qualities with ability to take up without splitting or strain the shrinkage tendencies resulting from the wetting of the fabric as if canvas were used for example; and to withstand even the high degree of heat present in freshly condensed steam and the like. In the present instance, besides the tightly knitted loops 14 there are also provided terry loops 15 to assist in holding an accumulation of dirt and oil. Tightly knitted cotton terry cloth is preferred. One example of this is the cloth on the market under the name "Jamac."

The cylinder 11 is formed at its open end with a flange 16 and the cloth bag is held against it by a ring 17 which can be readily slipped off for replacement of the bag. The casing member 4 is formed with a flange 18 and has an interior annular recess 19 for the reception of the flange 17 and washers 20 and 21. It has a forward surface adapted to fit tightly against a similar surface on a flange 22 on the casing member 5. The flanges 18 and 22 are tightly clamped together in readily removable fashion as by a suitable number of bolts 23 (for example four) and of nuts 24.

In use, the filter is screwed into unions 25 and 26 to provide a portion of a feed line, for example of a boiler. In order to clean the filter, it is only necessary to disconnect one union, to loosen the other, and to remove one set of nuts 24 from their bolts 23. The casing members can then be separated, the filter 10 taken out, the ring 17 and the dirt-laden cloth removed, a new or cleaned knitted cloth put on and the ring 17 slipped over it, and the parts assembled and reinserted in the feed line.

In the form of construction shown in Fig. 3, there is provided a filter unit comprising a casing 30 having an inlet 40, a filter chamber 41 and an outlet 42. In the chamber 41 is a filter proper 43 comprising as exemplified a perforate metallic element 44 and a knitted cover 45 held on by a ring 46. In the present instance the flange 47 on the metallic element 44 is somewhat thicker than the flange 16, and instead of being open at its further end is formed with a series of lateral openings 48 which communicate with an annular bore 49 in the casing member 30 which provides the chamber 41. An additional casing member in the form of plug 50 screws into a threaded bore 51 in the casing member 30 and can be screwed by means of the threads 52 so as to hold the flange tightly against a shoulder 53. As will be seen the inlet 40 instead of running in a straight line to the chamber 41 enters the casing 30 laterally and then runs downwardly through a channel 54 to the chamber. The inlet and outlet 40 and 42 are each threaded for reception of unions not shown but which may be similar to those shown in Fig. 1. A washer 55 is desirably provided between the flange 47 and the shoulder 53. To prevent the collection of sediment there is provided in the bottom of the chamber a drain 56 having a cock 57. A washer 58 lies between the top of the casing and a rim 59 on the plug 50.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A filter comprising a perforate flanged cylinder, a pair of casing members adapted to clamp between them the flange of said cylinder and formed wtih inlet and outlet portions respectively and with means for connecting the same in a fluid line, said cylinder being located inside the casing between said inlet and outlet portions, a stretched stretchable knitted fabric bag on said cylinder, a ring for clamping said bag over said cylinder, and releasable means for clamping the flange of said cylinder between said casing members.

2. A filter comprising a perforate flanged cylinder, a pair of casing members adapted to clamp between them the flange of said cylinder and formed with inlet and outlet portions respectively and with means for connecting the same in a fluid line, said cylinder being located inside the casing between said inlet and outlet portions, a stretched stretchable knitted fabric bag on said cylinder, a ring for clamping said bag over said cylinder, mating flanges on said casing members, and releasable means to draw said casing members together.

3. A feed line portion comprising a perforate flanged cylinder, casing means including a pair of members adapted to clamp between them the flange of said cylinder and formed to provide a chamber surrounding said cylinder, inlet and outlet portions at the respective ends of the cylinder, a releasable union secured to said inlet portion, a releasable union secured to said outlet portions, and a stretchable knitted cloth covering tightly surrounding the perforated cylinder.

4. A filter comprising casing means providing a chamber having an inlet and an outlet, a perforate cup-shaped filter body element, releasable means for retaining said filter element in place in said casing means, a knitted terry cloth bag fitted over said filter body element, and a ring drawing said bag tightly over said filter body element.

5. A filter comprising a perforated hollow cylinder, a stretched stretchable knitted fabric bag covering said cylinder, a ring drawing said fabric bag tightly over said cylinder and two mating casing members surrounding said cylinder and comprising two chambers permeably separated by the said cylinder; said mating casing members having releasable means for securing them together and means for connecting the said two chambers with a fluid line.

6. A filter comprising a perforated hollow flanged cylinder, a stretched stretchable knitted fabric bag covering said cylinder, a ring drawing said fabric bag tightly over said cylinder and two mating casing members surrounding said cylinder and comprising two chambers separated by the flange of said cylinder and permeably separated by the perforated, fabric-covered body of said cylinder; said mating casing members being secured together and releasable from each other for replacing the said fabric bag on the cylinder, having means providing a recess to receive and hold the flange of said cylinder and means for connecting the said two chambers with a fluid line.

7. A filter comprising a perforated hollow flanged cylinder, a stretched stretchable knitted bag covering said cylinder, a ring drawing said fabric bag tightly over said cylinder and two mating casing members surrounding said cylinder, one said casing member comprising one chamber and, in mated combination with the other said casing member, another chamber, said two chambers being separated by the flange of said cylinder and permeably separated by the perforated, fabric-covered body of said cylinder; said first casing member having means for connecting the said chambers, respectively, with a fluid line and both said mating casing members having matching releasable means for securing them together and means providing a recess to receive and hold the flange of the said cylinder.

8. A filter comprising a stretched stretchable knitted fabric bag, a perforated flanged cylinder covered thereby and casing means surrounding said cylinder; said casing means in combination with the fabric-covered outside of said cylinder comprising one chamber and said casing means in combination with the inside of said cylinder comprising another chamber, said two chambers being separated by the flange of said cylinder and being permeably communicating through the said knitted fabric bag and the perforations on said cylinder and each of the two chambers being provided, respectively, with means for connection with a fluid line.

9. A filter comprising a stretched stretchable knitted fabric bag, a perforated flanged cylinder covered thereby and casing means surrounding said cylinder, said casing means comprising two members; one said member, in combination with the fabric-covered outside of said cylinder comprising one chamber and the second said member, in combination with the inside of said cylinder, comprising another chamber, said two chambers being separated by the flange of said cylinder and being permeably communicating through the said knitted fabric bag and the perforations on said cylinder and each of the said two chambers being provided, respectively, with means for connecting the same with a fluid line, and the said two members comprising the casing means having matching releasable means for securing them together.

10. A filter as claimed in claim 9 wherein the flange of the said cylinder is held in a recess formed by the two members comprising the casing means.

11. A filter comprising a stretched stretchable knitted fabric bag, a perforated flanged cylinder covered thereby and casing means surrounding said cylinder, said casing means comprising two members; one said member comprising, in combination with the fabric-covered outside of said cylinder, one chamber and, in combination with the inside of said cylinder, another chamber, said two chambers being separated by the flange of said cylinder and being permeably communicating through the said knitted fabric bag and the perforations on said cylinder and each of the said two chambers being provided, respectively, with means for connecting the same with a fluid line, and the second member of the said casing means having substantially the form of a plug; said two members comprising the casing means being secured together by matching male and female threads and holding between them the flange of said cylinder.

12. A filter comprising a filter chamber, a perforated flanged filter cylinder in said chamber, a stretchable knitted fabric bag stretched over said filter cylinder, inlet means and outlet means disposed laterally of said chamber, downwardly extending means connecting said inlet with said chamber, means connecting said outlet with the interior of said cylinder and a plug coaxially above said cylinder, said plug having an inward extension holding the flange of said cylinder removably in place.

BERTRAM G. BROWN.

REFERENCES CITED

The following references are of record in the file of this patent:

UNITED STATES PATENTS

| Number | Name | Date |
|---|---|---|
| 568,874 | Pease | Oct. 6, 1896 |
| 629,941 | Wanner, Jr. | Aug. 1, 1899 |
| 630,363 | Krause | Aug. 8, 1899 |
| 633,368 | Riddick, Jr. | Sept. 19, 1899 |
| 664,280 | Leland | Dec. 18, 1900 |
| 847,537 | Abbott | Mar. 19, 1907 |
| 1,179,157 | Braun | Apr. 11, 1916 |
| 1,225,993 | Mullaney | May 15, 1917 |
| 1,331,237 | Burris | Feb. 17, 1920 |
| 1,352,961 | Hills | Sept. 14, 1920 |
| 1,394,762 | Schuermann | Oct. 25, 1921 |
| 1,438,983 | Collin | Dec. 19, 1922 |
| 1,455,136 | Gentzel | May 15, 1923 |
| 1,483,285 | De Coster | Feb. 12, 1924 |
| 1,630,504 | Walker | May 31, 1927 |
| 1,704,634 | Snider | Mar. 5, 1929 |
| 1,913,542 | Guggenheim | June 13, 1933 |
| 2,313,343 | Jacob | Mar. 9, 1943 |
| 2,313,344 | Jacob | Mar. 9, 1943 |
| 2,327,184 | Goodloe | Aug. 17, 1943 |
| 2,352,269 | Kraisse, Jr. | June 27, 1944 |
| 2,355,822 | Rugeley | Aug. 15, 1944 |
| 2,374,756 | Kisch et al. | May 1, 1945 |
| 2,382,560 | Goodloe | Aug. 14, 1945 |